(12) United States Patent
Lin et al.

(10) Patent No.: US 7,099,162 B2
(45) Date of Patent: Aug. 29, 2006

(54) PULSE-WIDTH-MODULATED SIGNAL TO DIRECT-CURRENT VOLTAGE CONVERTING UNIT

(75) Inventors: Meng-Chih Lin, Taipei Hsien (TW); Chien-Hung Cheng, Taipei Hsien (TW)

(73) Assignee: Asia Vital Components Co., Ltd., Kaohsiung (TW)

( * ) Notice: Subject to any disclaimer, the term of this patent is extended or adjusted under 35 U.S.C. 154(b) by 264 days.

(21) Appl. No.: 10/849,781

(22) Filed: May 21, 2004

(65) Prior Publication Data

US 2005/0194950 A1 Sep. 8, 2005

(30) Foreign Application Priority Data

Mar. 8, 2004 (TW) ............................. 93106074 A (51) Int. Cl.
*H02M 3/335* (2006.01)

(52) U.S. Cl. ................................. 363/21.11; 363/21.18

(58) Field of Classification Search .................. 363/16, 363/20, 21.01, 21.11, 21.18, 26, 50, 55, 56.01, 363/123, 131
See application file for complete search history.

(56) References Cited

U.S. PATENT DOCUMENTS 6,665,197 B1 * 12/2003 Gong et al. .............. 363/21.01
6,927,986 B1 * 8/2005 Nishimaki ................ 363/26
2001/0012210 A1 * 8/2001 Nagai et al. ............... 363/98

* cited by examiner

Primary Examiner—Adolf Berhane
(74) Attorney, Agent, or Firm—Birch, Stewart, Kolasch & Birch, LLP.

(57) ABSTRACT

A PWM signal to DC voltage converting unit includes at least a switch section adapted to provide an on/off function; a driving section electrically connected to the switch section for driving the switch section to provide the on/off function; a first voltage stabilizing section electrically connected to the switch section for generating a voltage; a bridging section electrically connected to the first voltage stabilizing section for keeping the first voltage stabilizing section in one-direction transmission; a second voltage stabilizing section electrically connected to the bridging section for generating a voltage; and an electricity-storing section electrically connected to the second voltage stabilizing section, such that power transmitted by the first and the second voltage stabilizing section may be charged to or discharged from the electricity-storing element. By controlling a duty cycle of an input PWM signal, the output voltage can be adjusted.

18 Claims, 7 Drawing Sheets

PULSE-WIDTH-MODULATED SIGNAL TO DIRECT-CURRENT VOLTAGE CONVERTING UNIT

This Non-provisional application claims priority under 35 U.S.C. § 119(a) on Patent Application No(s). 93106074 filed in Taiwan, R.O.C. on Mar. 8, 2004, the entire contents of which are hereby incorporated by reference.

FIELD OF THE INVENTION

The present invention relates to a pulse-width-modulated (PWM) signal to direct-current (DC) voltage converting unit, which is able to regulate the duty cycle of a pulse-width-modulated signal to control the output voltage and the variation thereof, so as to provide different voltages needed by different loads in practical applications, and make an electrical device or element more convenient for use.

BACKGROUND OF THE INVENTION

Figure 1:
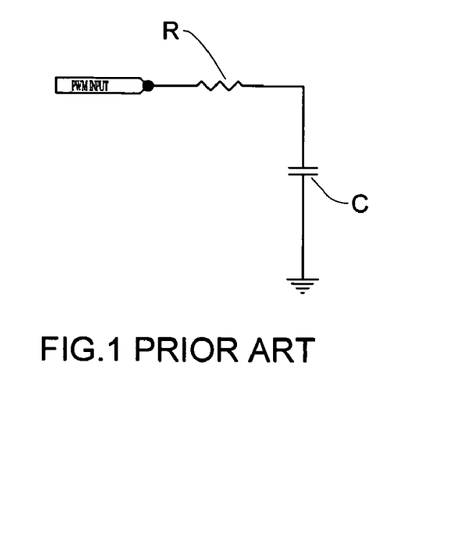
FIG. 1 is a schematic circuit diagram for an electric device or element according to prior art.

Any kind of electric or electronic device or element, either a signal-generating source or a load, needs power supply to work normally. However, each device or element requires different voltage. Please refer to FIG. 1 that shows a prior art. When a pulse-width-modulated (PWM) signal is in a duty cycle, it charges a capacitor C via a resistance R; and when the PWM signal is in a non-duty cycle, the capacitor C discharges until the PWM signal is Hi (that is, in the duty cycle) again. The capacitor C is then charged again. Therefore, generally speaking, an output voltage in the prior art shown in FIG. 1 is substantially constant.

However, in practical applications, the above-described prior art often fails to provide different voltages according to actual need. Therefore, it is necessary to improve the disadvantage in the prior art.

SUMMARY OF THE INVENTION

A primary object of the present invention is to provide a pulse-width-modulated (PWM) signal to direct-current (DC) voltage converting unit for adjusting the duty cycle of an input PWM signal and thereby controlling the output voltage to meet a potential required in practical application, and making an electrical device or element more convenient for use.

Another object of the present invention is to provide a PWM signal to CD voltage converting unit that is able to change or adjust the variation of output voltage depending on actual need.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 2:
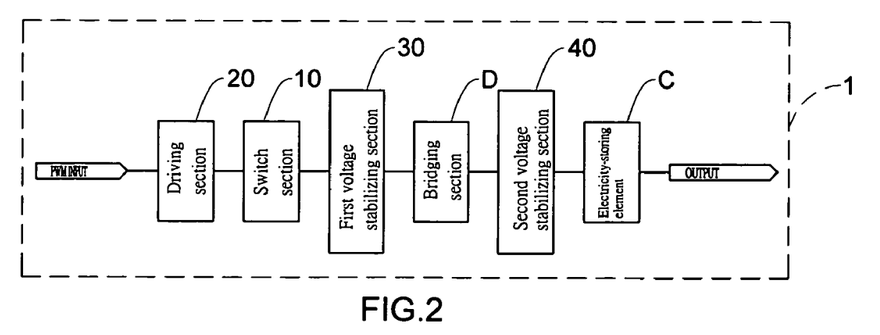
FIG. 2 is a block diagram for a preferred embodiment of the present invention.

Please refer to FIG. 2 that is a block diagram of a PWM signal to DC voltage converting unit 1 according to a preferred embodiment of the present invention. As shown, the present invention includes at least a switch section 10 providing an on/off function. Please refer to FIG. 3. The switch section 10 may consist of a first switch member 11. In an alternative embodiment of the present invention, a second switch member 12 may be further connected to the first switch member 11. In a feasible embodiment of the present invention, the first and the second switch member 11, 12 may be transistors, field effect transistors (FET), or other equivalent members, such as TRAIC, silicon controlled rectifier (SCR), etc., that are able to generate the on/off function when being triggered by a signal, such as a pulse-width-modulated (PWM) signal. One thing to be considered in connecting the second switch member 12 to the first switch member 11 is an output of one switch member in use shall have a phase opposite to that of an input thereof. For example, in the case the first switch member 11 is a transistor, and a signal is input via a base thereof and output via a collector thereof, then the collector and the base shall have opposite phases. Moreover, it is also feasible to provide a resistance 13 between the first and the second switch member 11, 12 to reduce the current flowing through the switch members.

Figure 3:
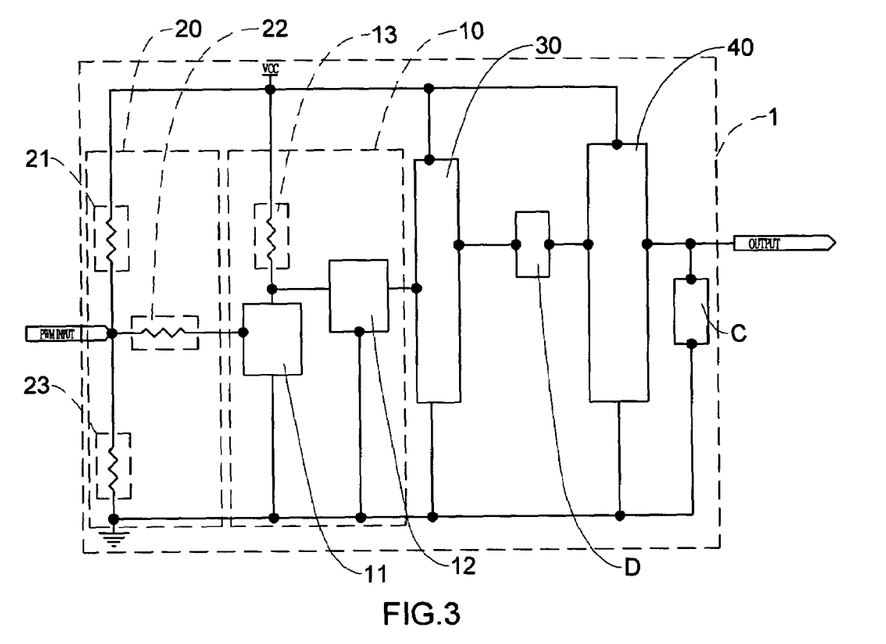
FIG. 3 is a schematic circuit diagram for the preferred embodiment of the present invention shown in FIG. 2.

A driving section 20 is electrically connected to the switch section 10 for driving the latter to generate the on/off function. In a feasible embodiment of the present invention, the driving section 20 may consist of a first resistance 21, a second resistance 22, and a third resistance 23 that are interconnected to one another, as shown in FIG. 3. Alternatively, the third resistance 23 may be replaced with a Zener diode (not shown). With a voltage dividing effect provided by the third resistance 23 or the Zener diode, a driving signal is output to cause the switch section 10 to generate the on/off function. That is, a PWM signal may be sent to the switch section 10 via the second resistance 22.

A first voltage stabilizing section 30 is electrically connected to the switch section 10. The first voltage stabilizing section 30 may be formed from serially connected resistances or serially connected resistance and Zener diode, as shown in FIGS. 4 through 12, which will be described in more details later. A bridging section D is electrically connected to the first voltage stabilizing section 30, so as to keep the latter in one-direction transmission. The bridging section D may be a diode.

A second voltage stabilizing section 40 is electrically connected to the bridging section D, and may be formed from serially connected resistances or serially connected resistance and Zener diode, as shown in FIGS. 4 through 12, which will be described in more details later. An electricity-storing element C is electrically connected to the second voltage stabilizing section 40, so that power transmitted by the first and the second voltage stabilizing section 30, 40 may be charged to or discharged from the electricity-storing element C, which may be a capacitor.

The following are steps included in a feasible operating process of the PWM signal to DC voltage converting unit 1 of the present invention.

In step 1, a PWM signal is input via the second resistance 22. When the PWM signal is in a duty cycle, the switch section 10 is on, and the first voltage stabilizing section 30 could not provide the voltage dividing effect because the voltage-dividing resistance or Zener diode has a voltage approximate to zero. This will be described in more details later.

In step 2, since the first voltage stabilizing section 30 does not provide the voltage dividing effect, it does not apply a forward bias to the bridging section D, and the bridging section D is off.

In step 3, the second voltage stabilizing section 40 provides the voltage dividing effect, which will be described later, to provide a voltage output, which is also the output of the PWM signal to DC voltage converting unit 1 of the present invention, and to charge the electricity-storing element C.

In step 4, when the PWM signal is in a non-duty cycle, the switch section 10 is off, and the first voltage stabilizing section 30 provides the voltage dividing effect. That is, a voltage is generated at the voltage-dividing resistance or Zener diode, which will be described later.

In step 5, since the voltage division generated at the first voltage stabilizing section 30 applies a forward bias to the bridging section D, the bridging section D is on.

In step 6, the output of the PWM signal to DC voltage converting unit 1 of the present invention, that is, the voltage of the electricity-storing element C, is a voltage-dividing potential provided by the first voltage stabilizing section 30, as will be described later.

Please refer to FIGS. 4 through 12. The first and the second voltage stabilizing section 30, 40 may be serially connected resistances or serially connected resistance and Zener diode to produce the output voltage of the PWM signal to DC voltage converting unit 1 of the present invention. The following are some feasible modes for the present invention.

Figure 4:
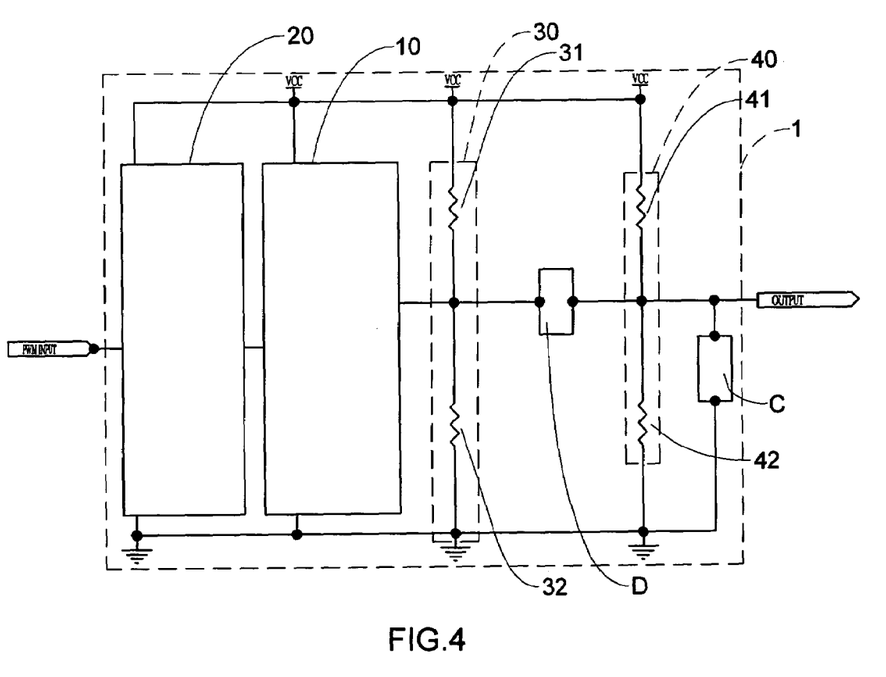
FIG. 4 is a schematic circuit diagram for a first alternative embodiment of the present invention derived from FIG. 3.

In a first mode as shown in FIG. 4, both the first and the second voltage stabilizing section 30, 40 include serially connected resistances. That is, the first voltage stabilizing section 30 consists of a voltage-dividing resistance 31 connected to another voltage-dividing resistance 32 to provide the voltage dividing effect; and the second voltage stabilizing section 40 consists of a voltage-dividing resistance 41 connected to another voltage-dividing resistance 42 to provide the voltage dividing effect. Therefore, the voltage dividing resistances 32, 42 are able to generate a voltage dividing potential.

Figure 5:
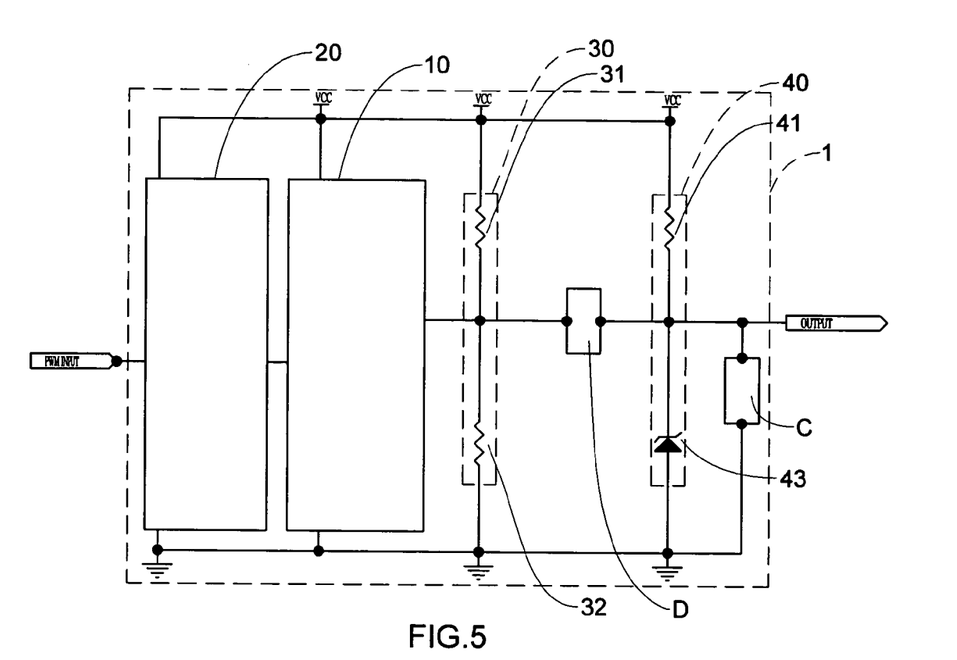
FIG. 5 is a schematic circuit diagram for a second alternative embodiment of the present invention derived from FIG. 3.

In a second mode as shown in FIG. 5, the first voltage stabilizing section 30 consists of serially connected resistances, while the second voltage stabilizing section 40 consists of serially connected resistance and Zener diode. That is, the first voltage stabilizing section 30 consists of a voltage-dividing resistance 31 connected to another voltage-dividing resistance 32 to provide the voltage dividing effect; and the second voltage stabilizing section 40 consists of a voltage-dividing resistance 41 connected to a Zener diode 43 to provide the voltage dividing effect. Therefore, the voltage dividing resistance 32 and the Zener diode 43 are able to generate a voltage dividing potential.

Figure 6:
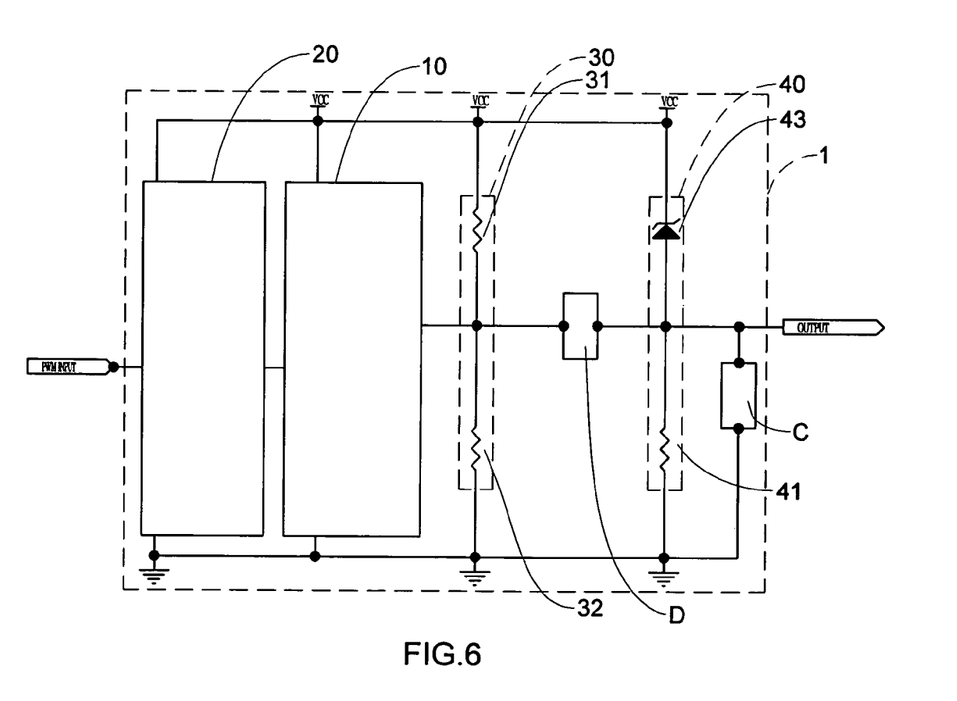
FIG. 6 is a schematic circuit diagram for a third alternative embodiment of the present invention derived from FIG. 3.

FIG. 6 shows a third mode, which is generally similar to the mode 2, except that the serially connected Zener diode 43 and voltage dividing resistance 41 of the second voltage stabilizing section 40 have been changed over in their position.

Figure 7:
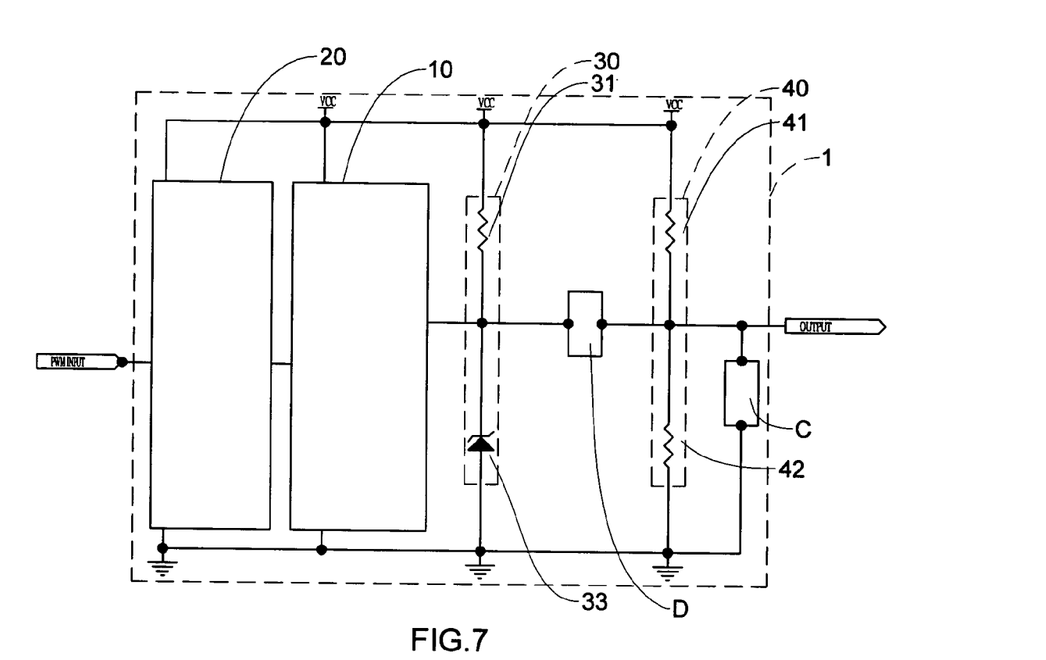
FIG. 7 is a schematic circuit diagram for a fourth alternative embodiment of the present invention derived from FIG. 3.

In a fourth mode shown in FIG. 7, the first voltage stabilizing section 30 consists of serially connected resistance and Zener diode, while the second voltage stabilizing section 40 consists of serially connected resistances. That is, the first voltage stabilizing section 30 consists of a voltage-dividing resistance 31 connected to a Zener diode 33 to provide the voltage dividing effect; and the second voltage stabilizing section 40 consists of a voltage-dividing resistance 41 connected to another voltage-dividing resistance 42 to provide the voltage dividing effect. Therefore, the Zener diode 33 and the voltage dividing resistance 42 are able to generate a voltage dividing potential.

Figure 8:
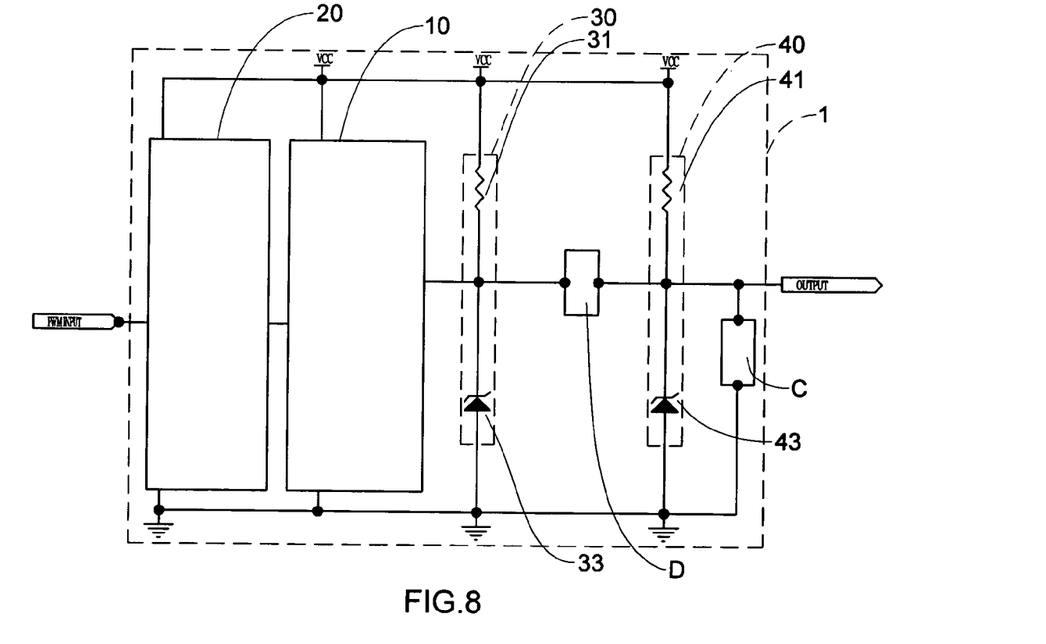
FIG. 8 is a schematic circuit diagram for a fifth alternative embodiment of the present invention derived from FIG. 3.

In a fifth mode shown in FIG. 8, both the first and the second voltage stabilizing section 30 consist of serially connected resistance and Zener diode. That is, the first voltage stabilizing section 30 consists of a voltage-dividing resistance 31 connected to a Zener diode 33 to provide the voltage dividing effect; and the second voltage stabilizing section 40 consists of a voltage-dividing resistance 41 connected to a Zener diode 43 to provide the voltage dividing effect. Therefore, the Zener diodes 33, 43 are able to generate a voltage dividing potential.

Figure 9:
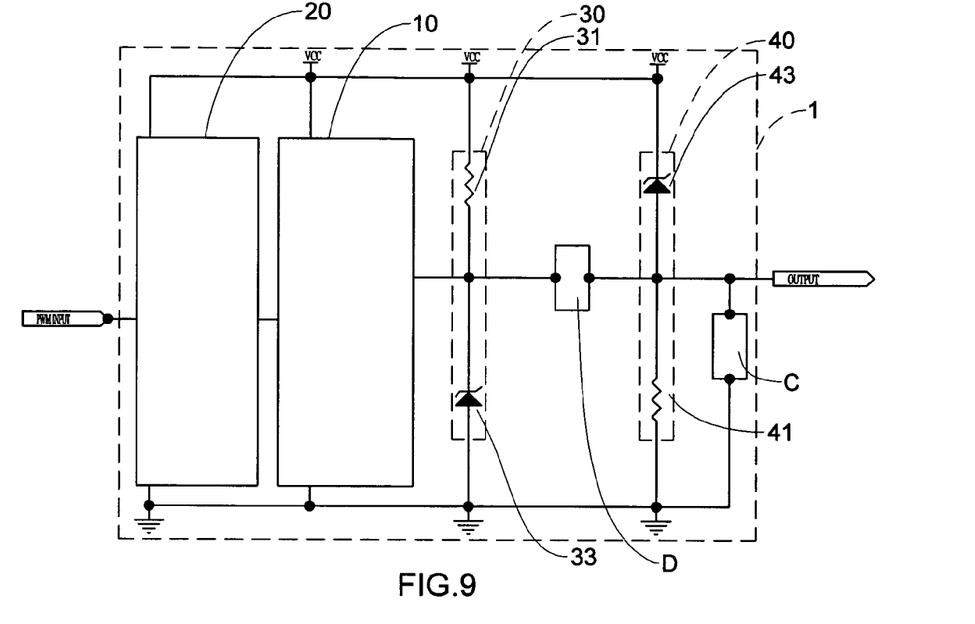
FIG. 9 is a schematic circuit diagram for a sixth alternative embodiment of the present invention derived from FIG. 3.

FIG. 9 shows a sixth mode, which is generally similar to the mode 5, except that the serially connected Zener diode 43 and voltage dividing resistance 41 of the second voltage stabilizing section 40 have been changed over in their position.

Figure 10:
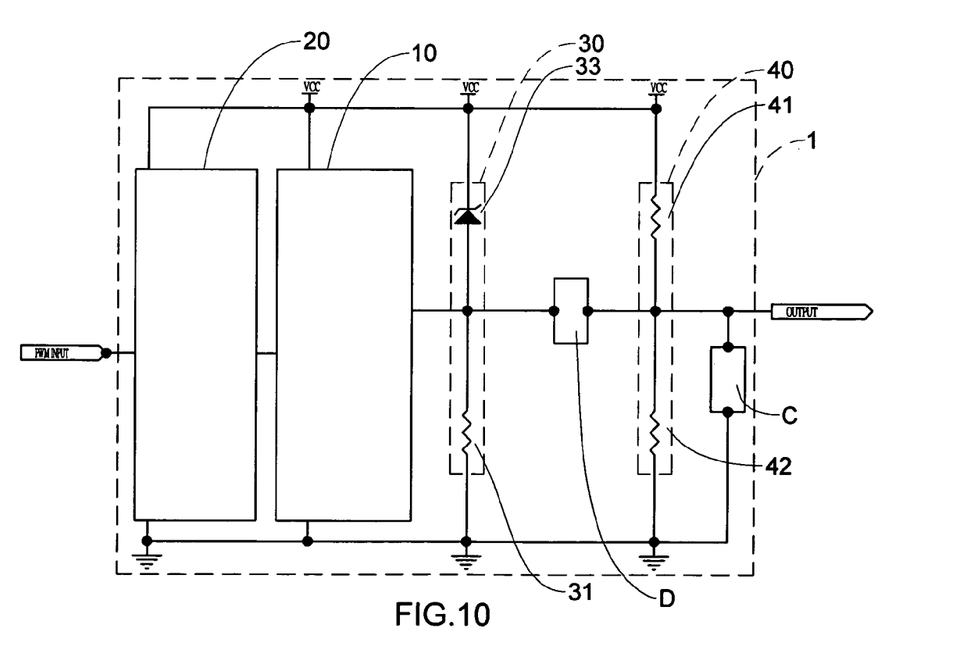
FIG. 10 is a schematic circuit diagram for a seventh alternative embodiment of the present invention derived from FIG. 3.

FIG. 10 shows a seventh mode, which is generally similar to the mode 4, except that the serially connected Zener diode 33 and voltage dividing resistance 31 of the first voltage stabilizing section 30 have been changed over in their position.

Figure 11:
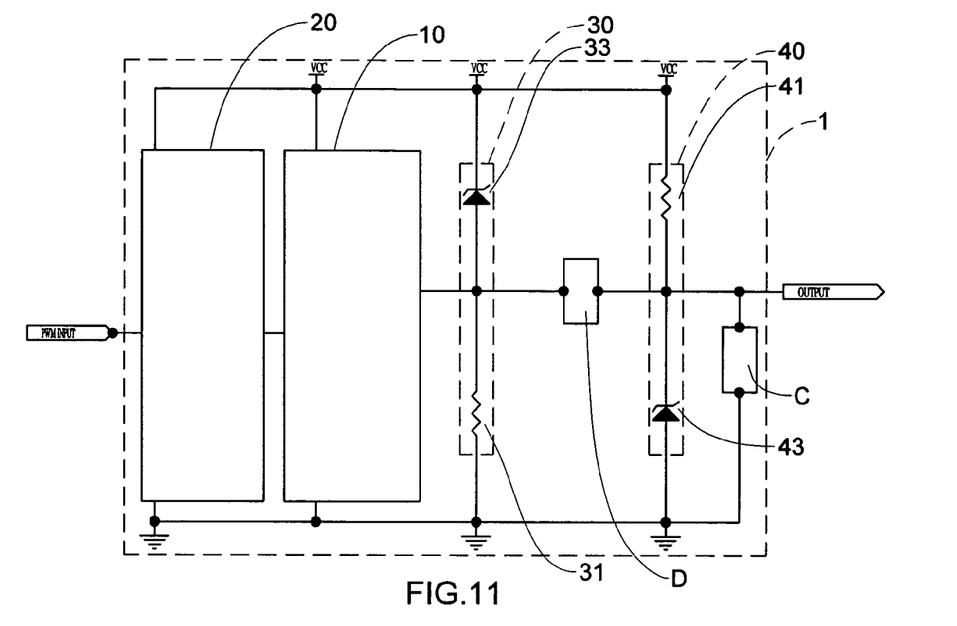
FIG. 11 is a schematic circuit diagram for an eighth alternative embodiment of the present invention derived from FIG. 3.

FIG. 11 shows an eighth mode, which is generally similar to the mode 5, except that the serially connected Zener diode 33 and voltage dividing resistance 31 of the first voltage stabilizing section 30 have been changed over in their position.

Figure 12:
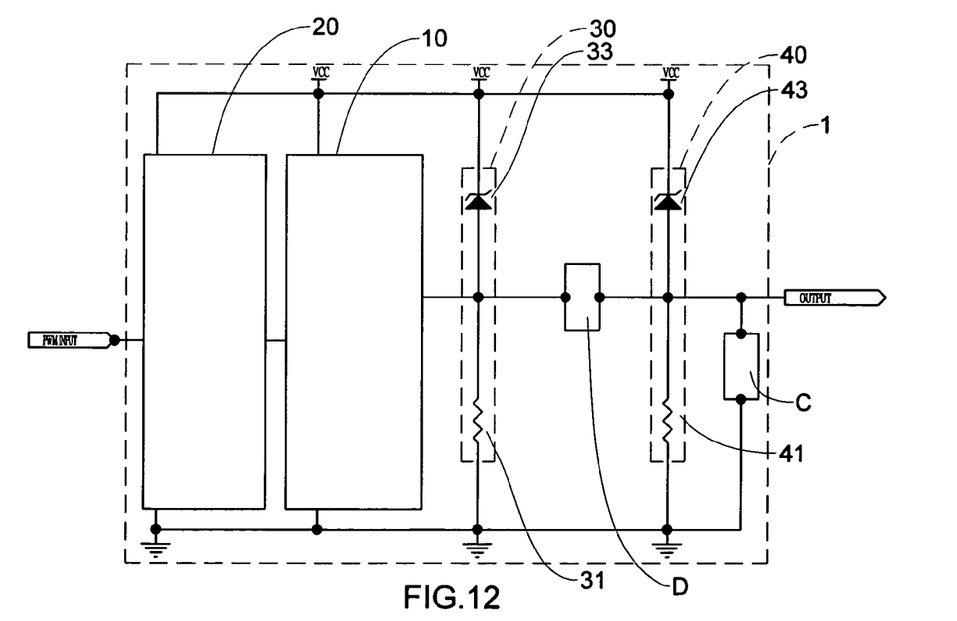
FIG. 12 is a schematic circuit diagram for a ninth alternative embodiment of the present invention derived from FIG. 3.

FIG. 12 shows a ninth mode, which is generally similar to the mode 6, except that the serially connected Zener diode 33 and voltage dividing resistance 31 of the first voltage stabilizing section 30 have been changed over in their position. This mode 9 is also similar to the mode 8, except that the serially connected Zener diode 43 and voltage dividing resistance 41 of the second voltage stabilizing section 40 have been changed over in their position.

In conclusion, when the PWM signal is in a duty cycle, the second voltage stabilizing section 40 provides the voltage dividing effect to generate a voltage at the voltage dividing resistance or Zener diode, so as to provide a voltage output and charge the electricity-storing element C. When the PWM signal is in a non-duty cycle, the first voltage stabilizing section 30 provides the voltage dividing effect to generate a voltage at the voltage dividing resistance or Zener diode, and applies a forward bias to the bridging section D, so that the bridging section D is on, and the voltage-dividing potential generated by the first voltage stabilizing section 30 is output. However, the voltage output of the PWM signal in the non-duty cycle is smaller than the voltage output of the PWM signal in the duty cycle. Therefore, the output voltage may be adjusted by way of controlling the size or length of the duty cycle of the PWM signal and charging of the electricity-storing element C.

Figure 13:
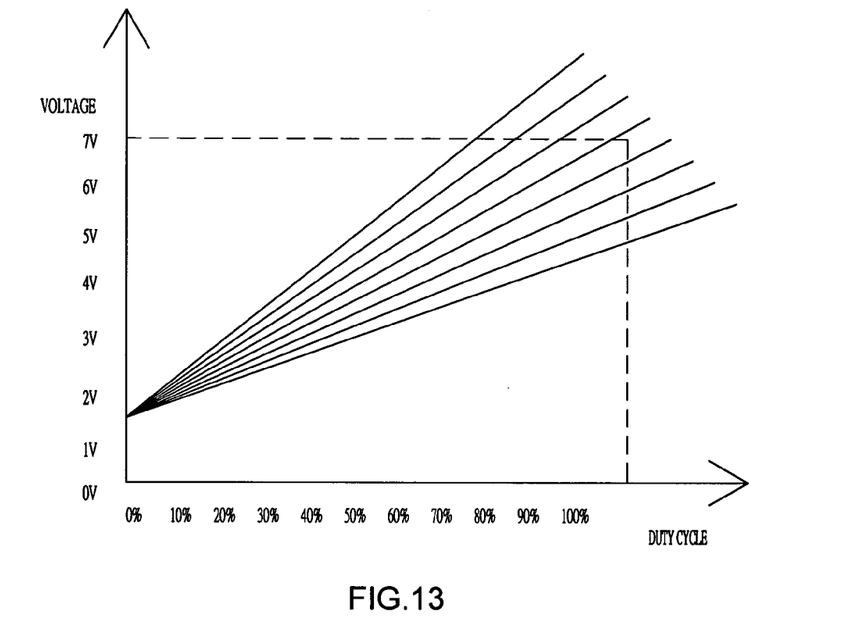
FIGS. 13 and 14 schematically shows the rate of change in output voltage adjusted through controlling the duty cycle of a PWM signal.

Furthermore, it is possible to obtain much more significant or drastic rate of change in the output voltage adjusted through controlling the duty cycle of the PWM signal by changing a resistance value or a voltage value of the Zener diode of the first and the second voltage stabilizing section 30, 40. Please refer to FIG. 13, in which a line having a larger inclination indicates a higher rate of change in the output voltage adjusted through controlling the duty cycle of the PWM signal.

Figure 14:
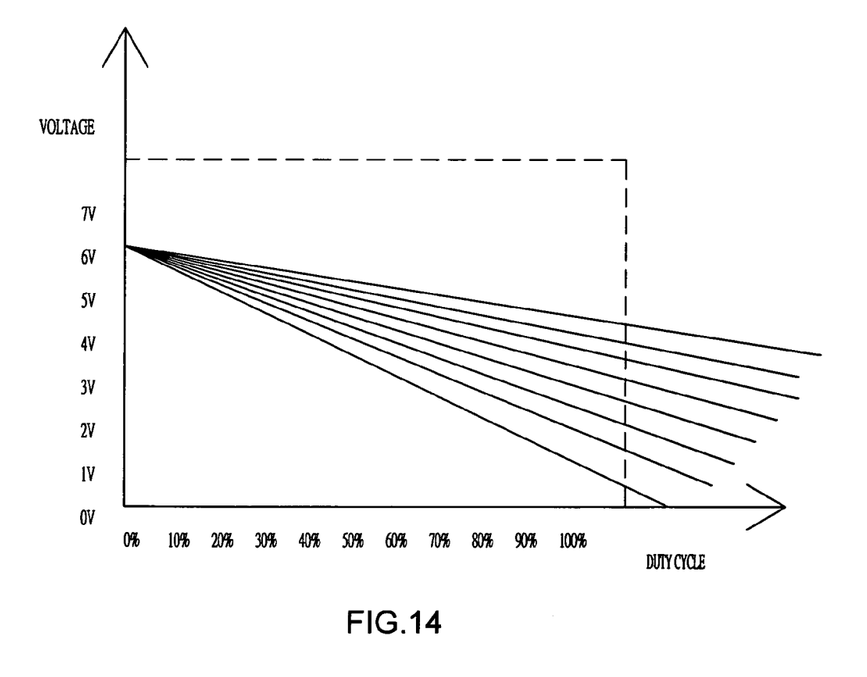

In the event the output of one of the switch members that is in use has a phase opposite to that of the input of the same switch member, the rate of change in the output voltage adjusted through controlling the duty cycle of the PWM signal is shown in FIG. 14.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A PWM signal to DC voltage converting unit, comprising at least a switch section adapted to provide an on/off function; a driving section electrically connected to said switch section for driving said switch section to provide the on/off function; a first voltage stabilizing section electrically connected to said switch section for generating a voltage; a bridging section electrically connected to said first voltage stabilizing section for keeping said first voltage stabilizing section in one-direction transmission; a second voltage stabilizing section electrically connected to said bridging section for generating a voltage; and an electricity-storing section electrically connected to said second voltage stabilizing section, such that power transmitted by said first and said second voltage stabilizing section may be charged to or discharged from said electricity-storing element.

2. The PWM signal to DC voltage converting unit as claimed in claim 1, wherein said switch section includes at least one switch member.

3. The PWM signal to DC voltage converting unit as claimed in claim 2, wherein at least two said switch members are included in said switch section.

4. The PWM signal to DC voltage converting unit as claimed in claim 2, wherein said switch member comprises a transistor.

5. The PWM signal to DC voltage converting unit as claimed in claim 2, wherein said switch member comprises a FET.

6. The PWM signal to DC voltage converting unit as claimed in claim 2, wherein said switch member comprises a TRAIC.

7. The PWM signal to DC voltage converting unit as claimed in claim 2, wherein said switch member comprises an SCR.

8. The PWM signal to DC voltage converting unit as claimed in claim 1, wherein said bridging section comprises a diode.

9. The PWM signal to DC voltage converting unit as claimed in claim 1, wherein said first voltage stabilizing section comprises two resistances that are connected to one another in series.

10. The PWM signal to DC voltage converting unit as claimed in claim 1, wherein said first voltage stabilizing section comprises a resistance and a Zener diode that are connected to one another in series.

11. The PWM signal to DC voltage converting unit as claimed in claim 1, wherein said second voltage stabilizing section comprises two resistances that are connected to one another in series.

12. The PWM signal to DC voltage converting unit as claimed in claim 1, wherein said second voltage stabilizing section comprises a resistance and a Zener diode that are connected to one another in series.

13. The PWM signal to DC voltage converting unit as claimed in claim 1, wherein said electricity-storing element comprises a capacitor.

14. The PWM signal to DC voltage converting unit as claimed in claim 3, wherein said switch members are electrically connected to one another, and a resistance is connected to said switch members.

15. The PWM signal to DC voltage converting unit as claimed in claim 3, wherein said switch member comprises a transistor.

16. The PWM signal to DC voltage converting unit as claimed in claim 3, wherein said switch member comprises a FET.

17. The PWM signal to DC voltage converting unit as claimed in claim 3, wherein said switch member comprises a TRAIC.

18. The PWM signal to DC voltage converting unit as claimed in claim 3, wherein said switch member comprises an SCR.

* * * * *